Jan. 15, 1952 H. E. SCHLEICHER Re. 23,453

ROTARY ELECTROMAGNETIC TRANSFER SWITCH

Original Filed Oct. 26, 1944 4 Sheets-Sheet 1

INVENTOR.
Harold E. Schleicher
BY
Howson and Howson
his ATTORNEYS

ROTARY ELECTROMAGNETIC TRANSFER SWITCH

Original Filed Oct. 26, 1944 4 Sheets-Sheet 2

INVENTOR.
Harold E. Schleicher
BY
Howson and Howson
his ATTORNEYS

ROTARY ELECTROMAGNETIC TRANSFER SWITCH

Original Filed Oct. 26, 1944 4 Sheets-Sheet 3

INVENTOR.
Harold E. Schleicher
BY
Howson and Howson
his ATTORNEYS

ROTARY ELECTROMAGNETIC TRANSFER SWITCH

Original Filed Oct. 26, 1944 4 Sheets-Sheet 4

INVENTOR.
Harold E. Schleicher
BY
Howson and Howson
his ATTORNEYS

Reissued Jan. 15, 1952 Re. 23,453

UNITED STATES PATENT OFFICE 23,453

ROTARY ELECTROMAGNETIC TRANSFER SWITCH

Harold E. Schleicher, West Hartford, Conn., assignor to The Arrow-Hart & Hegeman Electric Company, Hartford, Conn., a corporation of Connecticut Original No. 2,553,478, dated May 15, 1951, Serial No. 560,407, October 26, 1944. Application for reissue September 28, 1951, Serial No. 248,801

10 Claims. (Cl. 200—104)

Matter enclosed in heavy brackets [ ] appears in the original patent but forms no part of this reissue specification; matter printed in italics indicates the additions made by reissue.

This invention relates to rotary magnetic switches of balanced shockproof type and represents an improvement upon and a new application of the similar invention described and claimed in my copending application, Ser. No. 511,855 entitled "Rotary Magnetic Switch" and filed November 26, 1943, now Patent No. 2,540,294, February 6, 1951.

It is an object of the invention to provide in a switch of the above type a fully enclosed electromagnetic operating mechanism which may be mounted directly on a panel with switching sections built on in any desired number to suit requirements.

Another object is to provide manual operating means available from the front of the panel when the switch is on the back with optionally usable means to lock the manual operating means and switch in any of three (emergency, normal or neutral) positions.

Another object is to provide a switch structure of the foregoing type utilizing a minimum number of insulating bodies or discs per pole arranged in a compact manner and using a minimum number of conductive parts.

Another object is to provide means for interchangeably positioning a movable switch member in any of a number of different positions on the main shaft, whereby said movable member may normally occupy either an open or a closed position as desired.

Another object is to provide an electromagnetic switch constructed for use as a transfer switch and embodying a coil circuiting arrangement which will cause armature actuation i. e. pick-up, or release i. e. drop-out at voltage conditions and values that are closely related.

Other objects and advantages of the invention will become apparent as it is described in connection with the accompanying drawings.

Although the device will be described in connection with a preferred form and use as a transfer switch, it should be understood that it is not limited in that respect.

In some conventional circuits there are two sources of power supply. One is a normal source, such as a generator which is used when all conditions are normal. The other is an emergency source such as storage batteries which is used when something goes wrong affecting the normal supply. At such time it is desirable to shift over automatically to the emergency supply.

Figure 1:
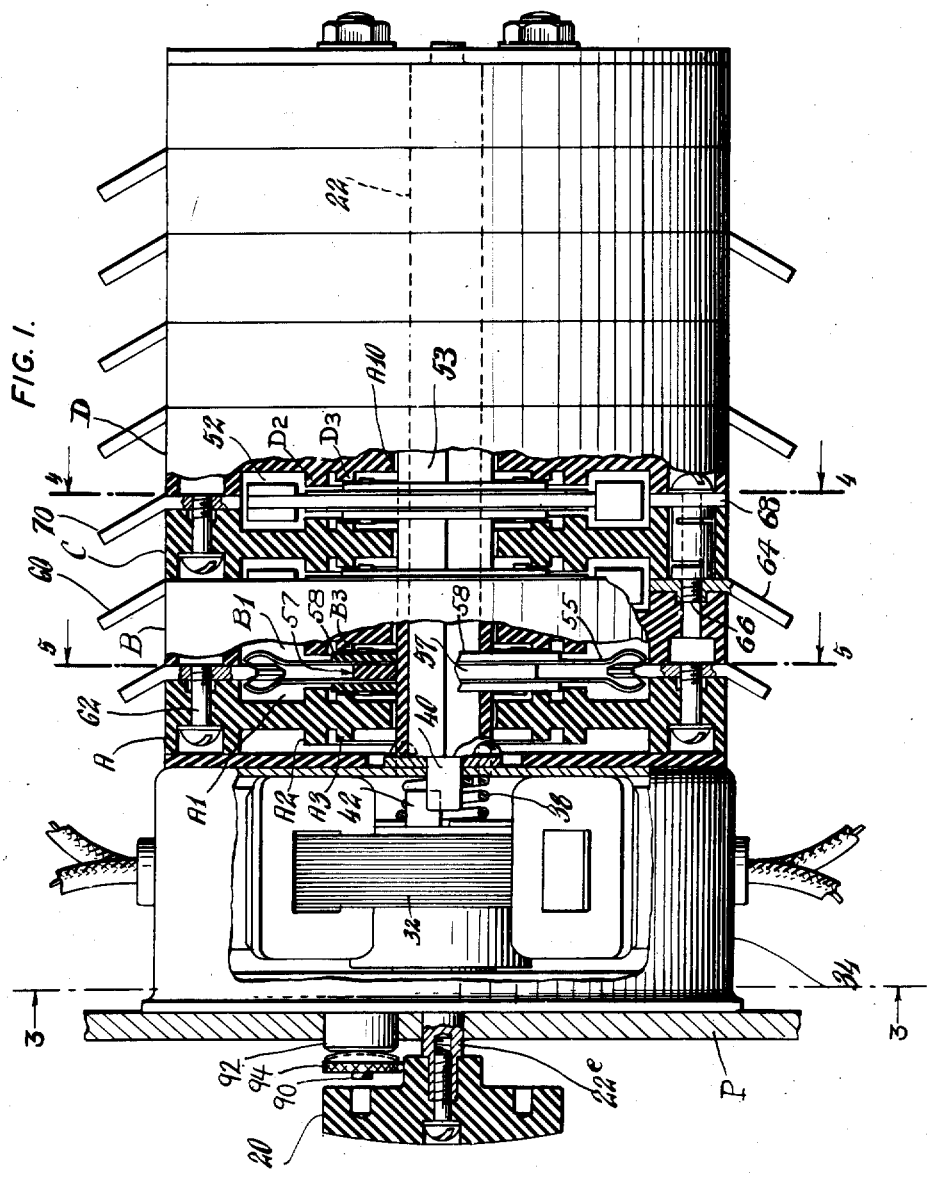
Figure 2:
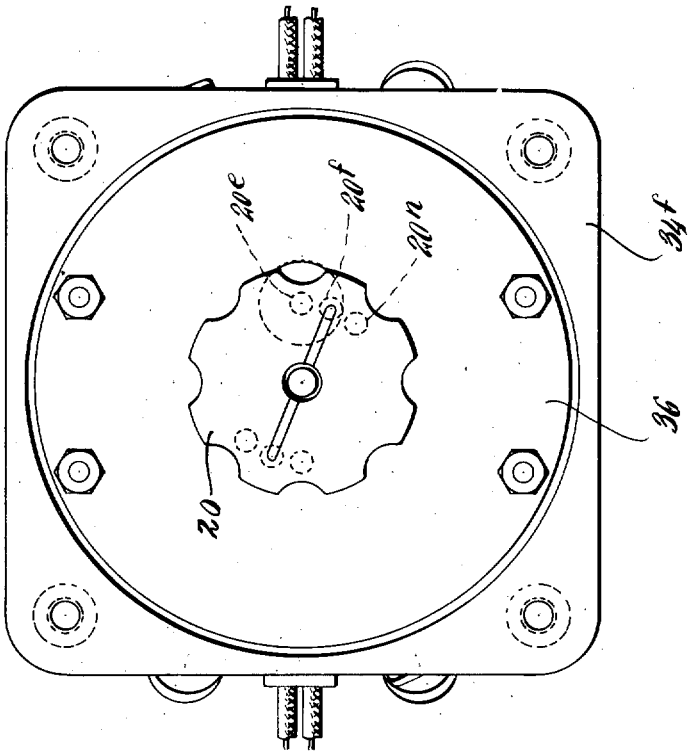
Figure 3:
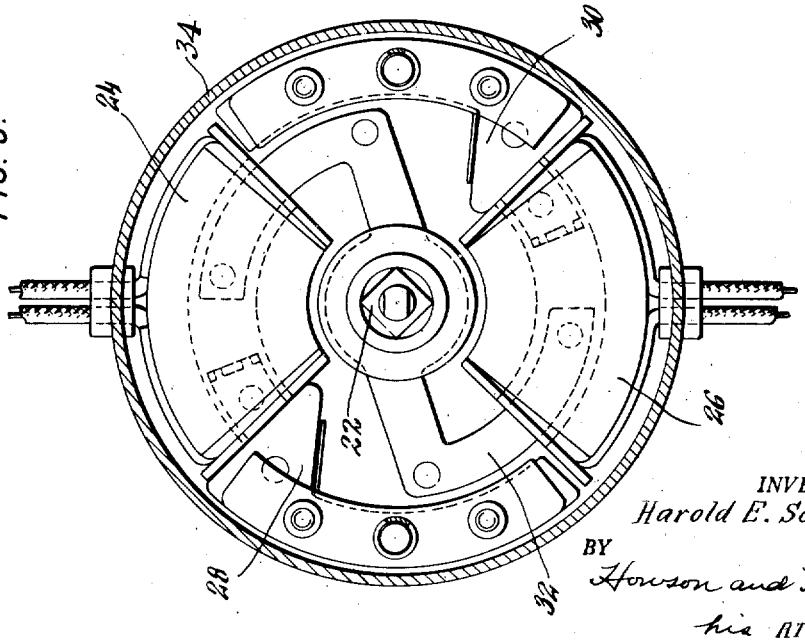
Figure 5:
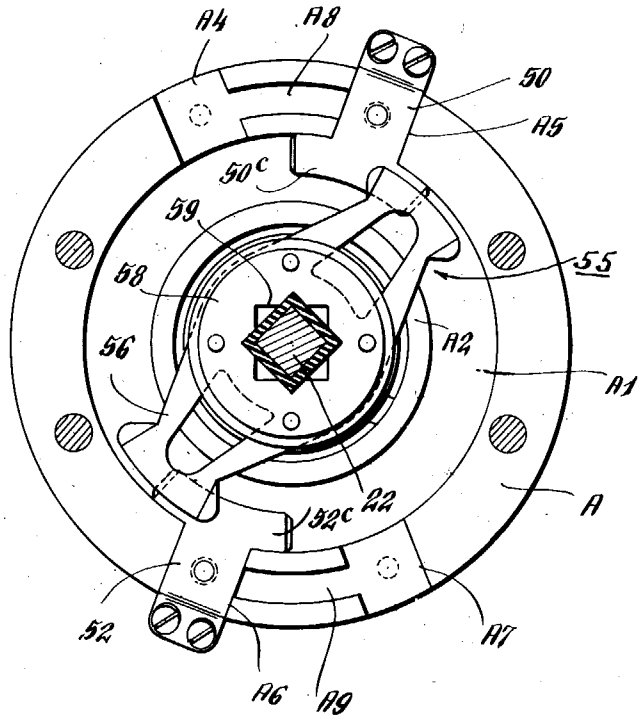
Figure 4:
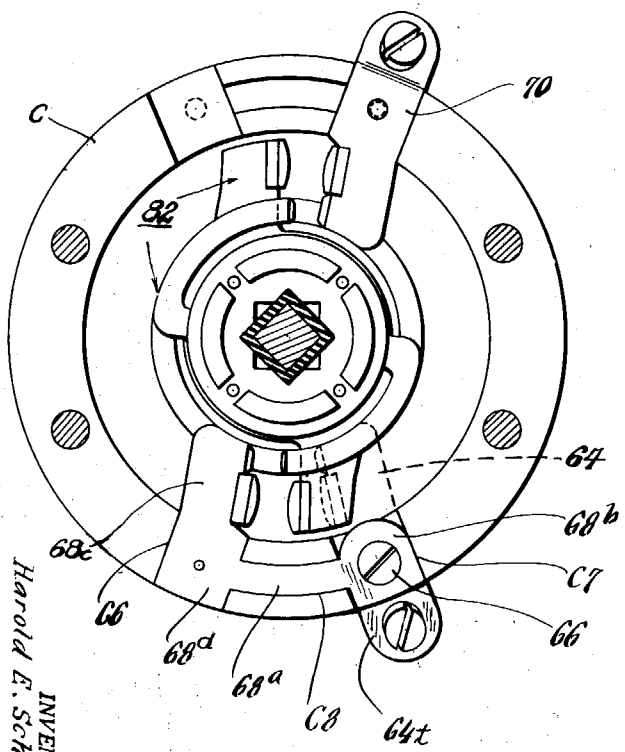
Figure 7:
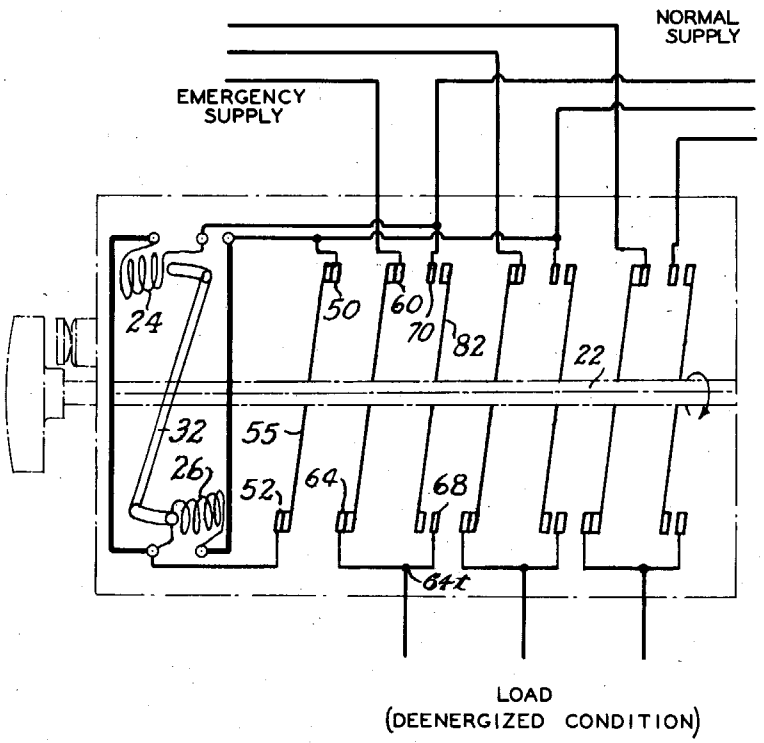
Figure 6:
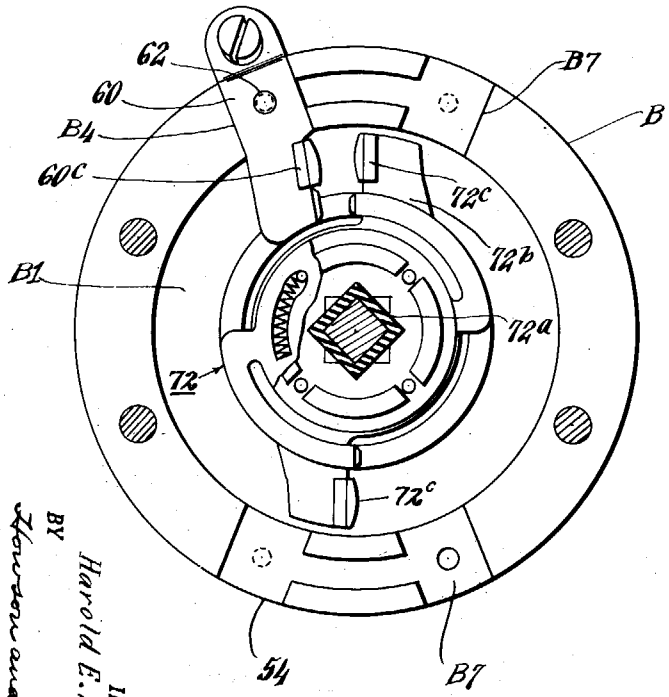

In the drawings, wherein like numerals refer to like parts, Figure 1 is a side elevation view, partly in section, of a switch embodying the invention; Figure 2 is an end elevation view of the switch illustrated in Fig. 1; Figure 3 is a transverse section view taken along line 3—3 of Fig. 1; Figures 4 and 5 are section views taken along lines 4—4 and 5—5 respectively of Fig. 1; Figure 6 is a view looking into the face of disc B when disc C and the remaining discs at the right end of Fig. 1 have been removed. In Figures 3, 4, 5 and 6 the parts are in "neutral" position. Figure 7 is a circuit diagram of one use of the invention.

Referring to the drawings and particularly to Fig. 1 thereof, the switch is adapted to be mounted in back of a panel P with a handle 20 in front of the panel mounted upon an extension 22e of the main shaft 22 of the switch.

The operating mechanism for electromagnetically controlling the movement of the switch is of the type disclosed in my co-pending application Ser. No. 511,855 supra and may be generally described as comprising a pair of toroidal solenoid coils 24, 26 mounted upon core members 28, 30. The electromagnetic operating structure is also described and is claimed in my application Ser. No. 185,422 filed September 18, 1950, *now Patent No. 2,563,495, August 7, 1951,* entitled "Electromagnetic Operating Means for Rotary Electric Switches and Other Devices," which is a division of said application Ser. No. 511,855.

A Z-shaped armature 32 has arms of arcuate shape adapted to move into the toroidal solenoid coils as the coils become energized. The armature is mounted upon the main shaft 22 of the switch which is preferably of square section and passes through a square central aperture in the armature so that the armature and shaft turn together.

The parts of the electromagnetic mechanism are housed within a cup-shaped housing 34 whose open front is adapted to lie flush against the panel P. For securing the housing 34 to the panel a rectangular flange is formed on the open front peripheral edge 34f of the housing. The four corners of this flange are apertured for the reception of securing bolts which may pass through the panel P. The electromagnetic mechanism may be enclosed within the housing by a circular cover plate 36. Preferably the housing and the cover plate will be made of magnetic material to confine stray electro-magnetic flux.

For biasing the electro-magnet armature into deenergized position a coil spring 38 is provided within the housing 34 and wound around the main shaft of the device. One end of said spring presses against a fixed lug 40 and the other end of the spring presses against a lug 42 moving with the magnet armature.

The insulating base or body of the switch is built up from a number of identical circular molded insulating discs, such as A, B, C and D. Referring to Figures 1 and 5, each face of each disc is annularly recessed, as at A–1 (for convenience the numerals such as 1, 2, 3 are used to designate the various parts of the disc structure and the letters A, B and C are used in connection with these numerals to designate the particular disc referred to). The adjoining recesses in opposite faces of the adjoining discs, such as A–1, B–1 provide a chamber within which the several movable contact members, presently to be described, are adapted to rotate. Within each recess are concentric low annular ridges or ribs such as A2, A3. Each disc has a circular opening at its center for the main shaft 22. At diametrically opposite positions in one face of each disc are pairs of spaced radial grooves, for example A4 and A5, A6 and A7, each pair of grooves being connected by an arcuate channel such as A8 and A9.

When the switch is used as a transfer switch the disc A will have placed in its grooves A5 and A6, stationary contact and terminal members 50, 52 stamped from sheet metal each with a flat central portion fitting in the groove, and laterally enlarged inner ends 50c and 52c forming contacts extending into the annular recess or cavity formed by the recesses A1 and B1.

Flat insulating plugs 54 may fill the unused grooves A4 and A7.

For bridging the contacts 50c and 52c there may be mounted on the main shaft a symmetrical balanced rotary contact member designated generally by 55 and comprised of a pair of flexible conductive blades 56 of the shape illustrated, lying against opposite sides of an insulating spacing disc 57 and having laid against their opposite sides larger insulating guide discs 58. Rivets passing transversely through all the elements of the movable contact member may secure them together. In the center of the assembled member is an eight point star-shaped aperture 59 by means of which it is possible to place the contact member in any of eight positions on the square main shaft 22.

As the adjacent sections are fitted together the ribs A3 and B3 of the disc facing each other afford guides for the rotary movement of the contact within the chamber formed by the joining recesses A1, B1.

The movable contact 55 between discs A and B may be placed on the shaft 22 so as to engage the fixed contacts 52, 50 when the coils are deenergized. In that case if the coils are connected as illustrated diagrammatically in Fig. 7 (wherein like reference numerals refer to like parts of other figures) only one (24) of the solenoid coils will operate as a closing coil for moving the shaft upon energization. The other coil is shunted and only becomes encircuited when the contact 55 opens the shunt circuit. But the coil 26 may jointly exercise a holding function with the coil 24 to maintain the switch in energized position more effectively than the energizing force exercised by one coil alone.

Discs B and C are illustrative and typical of one pole of the multi-pole switch illustrated in Figure 1. On the disc B (Fig. 6) a stationary contact 60 comprising a central conductive bar portion, an inwardly extending contact supporting portion and an exteriorly extending terminal portion is laid in the groove B4. A block of good contact material 60c is soldered or welded to one edge of the end of the contact member which extends into the cavity formed by adjoining recesses B1 and C1 in the opposite faces of the discs B and C. This contact member 60 is secured in position by a bolt 62 passing through the disc B, the bolt head being counter-sunk.

Another stationary contact is adapted to fit in the groove B7 and is identical to the contact 60 but though lying in groove B7 it is secured against the face of the surface of the adjoining section disc C by a bolt 66 extending through disc C into a screw-threaded aperture in said contact 64. The bolt also serves to electrically connect contact 64 to a contact and terminal member designated generally by numeral 68 on the other side of disc C.

The contact and terminal member 68 is a sheet metal stamping having a flat portion 68d lying in the groove C6 and from which extends inwardly a contact portion 68c. Laterally extending from portion 68d is an arcuate bar portion 68a seating in the arcuate channel C8 to connect with a terminal plate portion 68b fitting into the groove C7. The screw 66 connects this terminal portion with the contact 64 on opposite sides of disc C. Diametrically opposite the contact portion of contact 68, and in groove C5 is a contact and terminal 70 identical to contact-terminal 60 (but facing in counterclockwise instead of clockwise direction).

The movable contact members which are adapted to connect the stationary contacts 62 and 64 between discs B and C, and the stationary contacts 68 and 70 between discs C and D are identical and are similar in structure to the movable contact members disclosed in my copending application Ser. No. 511,855 supra.

These movable contact members are insulated from the main shaft 22, on which they are mounted, by an insulating sleeve 53 slipped onto the shaft.

Since the details of the movable contact form no part of the present invention and are disclosed in said prior copending application, it need only be mentioned that the bridging contacts are formed as illustrated and are dynamically balanced. The bridging elements of these contacts are formed from heavy sheet metal with radial arms such as 72b on the end edges of which are affixed contact blocks, such as 72c, for engagement with the fixed contact block (60c for example). The bridging elements are moved by the shaft 22, there being a resilient lost motion connection therebetween as in my prior application which therefore need not be described in detail.

To enable mounting the movable contact member on the shaft in different angular positions an eight point star-shaped aperture is provided at 72a.

It will be apparent to those skilled in the art that the normal condition may be with the solenoid coils energized. In such a case the failure of the normal supply will cause deenergization of the holding coils, both of which will then become deenergized permitting the switch to open under the effort of the biasing spring 38.

When used as a transfer switch the movable contact member 72 between discs B and C may be positioned on shaft 22 so as to be normally disengaged from contacts 60 and 64; and the movable contact element 82 between discs C and D may be normally engaged with its complementary stationary contacts 68 and 70. Thus when an emergency condition occurs the electromagnetic operating mechanism will release the shaft 22 which will be turned by spring 38 to disengage the movable contact 82 from contacts 68 and 70 and will engage the contact 72 with contacts 60 and 64, thus transferring the load connected with terminal 64t from the normal line supply connected to contact 70 to the emergency supply connected with the terminal 60. Concomitantly the switch member 55 which has been disconnected from contacts 50 and 52 will engage those contacts to which the leads of one of the solenoid coils, for example 26, are connected. Thus that coil will now be bridged by the contact 55 and will become shunted out of action.

On resumption of normal service supply the coil 24 will become energized alone causing the electro-magnet to operate the switch. That will "open" the contact 55 which will permit the solenoid coil 26 to become energized in series with the coil 24 so that both will jointly hold the switch for normal supply.

In order that the switch may be locked in either normal or in emergency position, or if occasion demands in the neutral "off" position, there are provided in underside of the handle 20 three spaced recesses 20e, 20f, 20n for the reception of a locking pin 90. This pin is mounted in a boss or collar 92 affixed to the cover 36 of the electromagnet operating mechanism. Said boss or collar is internally bored and screw-threaded to receive an inner screw-threaded end of the locking pin. A knurled flange 94 is provided on the neck of the locking pin whereby the pin may be screwed toward or away from the handle 20 so as to engage within or be retracted from one or another of the holes 20n, 20e or 20f.

Thus, although the spring biases the shaft 22 and the handle 20 into "emergency" position, the handle may be grasped to move the shaft into normal or into emergency positions in case manual operation is desired. In either of these positions or in a neutral "off" or switch-open position, between normal and emergency positions, the switch may be locked by manipulating the knurled flange 94 as described.

It will be understood that although I have given a detailed description of only one pole of a transfer switch, the switch may be formed with any number of poles. In Figure 1 is illustrated three-pole transfer switch, the second and third poles being identical in structure to the one pole described.

The switch is not limited to use as a transfer switch. It may be used more generally. In any case, the bridging contact 55 in the circuit with the solenoid coils may be placed on shaft 22 so that it will be disengaged from the fixed contacts 50, 52 when the solenoid coils are deenergized. The star-shaped aperture 59 permits such variation in mounting. Under such conditions the contacts 50, 52, 53 may be connected conventionally as "sealing-in" or "holding" contacts as usual in electromagnetic switches, the term "sealing-in" being understood by those skilled in the art to refer to contacts which move closed with the main contacts under the influence of the solenoid and close a circuit through the solenoid to thereby hold themselves and the main contacts closed.

From the foregoing, it will be observed that the invention provides a balanced rotary magnetic transfer switch having a double throw contact arrangement on a single shaft controlled by a single armature. No mechanical interlock is necessary since there is energization in one position or direction only. The invention also provides for manual emergnecy control in case it should become necessary to throw the switch in one direction or another by hand. Without detracting from other advantages, the invention also provides latch means for holding the switch in any of the three positions. The provision for holding the switch in an intermediate or neutral position is particularly useful when it becomes necessary to quickly remove contacts for servicing or to disconnect the lines from the load.

The invention provides means to meet exacting requirements, such as in naval specifications. Conventional electromagnetic switches having a single magnet coil (or equivalent multiple coils acting in the same manner), if properly designed for continuous duty without overheating, will be actuated or "pick up" at approximately 85% of full voltage but will not release or "drop out" until the voltage has dropped to approximately 10% of full voltage. Thus, in the usual commercial forms of electromagnets there is a wide gap between pick up and drop out voltages. This gap is reduced materially by the present invention through the utilization of dual coils in the manner described. The invention enables drop out at 70% to 80% and pick up at 85% to 90% of full voltage. At the same time the sealing of the magnet in actuated position is more efficiently accomplished.

Many modifications within the scope of my invention will occur to those skilled in the art and therefore I do not limit my invention to the specific embodiment herein shown and described.

I claim:

1. In a rotary electro-magnetic switch a main shaft means for manually operating said shaft, a pair of rotary bridging contact means constructed and arranged for balanced movement with said shaft, electro-magnetic means for moving said bridging contact means in one direction and comprising a rotary balanced armature mounted on said shaft and solenoid coils acting thereon, spring means moving said bridging contact means in the opposite direction when said magnet is deenergized, electrically common stationary contact means engageable by both of said pair of bridging contact means in different positions, and separate stationary contact means one of which is engageable by one of said pair when that one of the pair engages said common contact means, [and by] the other of said separate contact means being engageable by the other of said pair when said other of the pair engages said common contact means, and means to lock said pair of bridging contact means in energized, deenergized or open-circuit positions of said shaft.

2. In a rotary electro-magnetic switch a main shaft means for manually operating said shaft, a pair of rotary bridging contact means constructed and arranged for balanced movement with said shaft, electro-magnetic means for moving said bridging contact means in one direction and comprising a rotary balanced armature mounted on said shaft and solenoid coils acting thereon, spring means moving said bridging contact means in the opposite direction when said magnet is deenergized, electrically common stationary contact means engageable by both of said pair of bridging contact means in different positions, and separate stationary contact means one of which is engageable by one of said pair when that one of the pair engages said common contact means [and by] the other of said separate contact means being engageable by the other of said pair when said other of the pair engages said common contact means, and means to lock said pair of bridging contact means in energized, deenergized or open-circuit positions of said shaft, comprising a handle on said shaft having recesses corresponding to said three positions, and a manually movable pin engageable within and removable from said recesses selectively at will.

3. In a rotary electro-magnetic switch, a main shaft, a pair of rotary contact means, an electro-magnet for moving said means in one direction, spring means moving said contact means in the opposite direction when said magnet is deenergized, electrically common stationary contact means engageable by both of said pair of contacts in different positions, and separate stationary contact means one of which is engageable by one of said pair when that one of the pair engages said common contact means, the other of said separate contact means being engageable by the other of said pair when said other of the pair engages said common contact means, a plurality of identical discs forming an insulating base for said switch, one of said stationary contacts and said electrically common contacts being secured to one disc, said other stationary contact being secured to an adjoining disc, said discs having recesses to provide an enclosed cavity between adjoining discs on movement of said rotary contact means.

4. In a rotary magnetic switch, a main shaft, a pair of rotary contact means, an electro-magnet for moving said means in one direction, spring means moving said contact means in the opposite direction when said magnet is deenergized, electrically common stationary contact means engageable by both of said pair of contacts in different positions, and separate stationary contact means one of which is engageable by one of said pair when that one of the pair engages said common contact means, the other of said separate contact means being engageable by the other of said pair when said other of the pair engages said common contact means, a plurality of identical discs forming an insulating base and supporting said stationary contacts, said discs being recessed to provide an enclosed cavity between adjoining discs for movement of said rotary contact means, means to mount the switch on a panel comprising a cup-shaped casing of magnetic material for said electro-magnet provided with a flange adapted to lie flush against and be secured to a panel with said main shaft perpendicular to the panel.

5. In a rotary magnetic switch, a main shaft, a pair of rotary contact means, an electro-magnet for moving said means in one direction, spring means moving said contact means in the opposite direction when said magnet is deenergized, electrically common stationary contact means engageable by both of said pair of contacts in different positions, and separate stationary contact means one of which is engageable by one of said pair when that one of the pair engages said common contact means, the other of said separate contact means being engageable by the other of said pair when said other of the pair engages said common contact means, a plurality of identical discs forming an insulating base and supporting said stationary contacts, said discs being recessed to provide an enclosed cavity between adjoining discs for movement of said rotary contact means, means to mount the switch on a panel comprising a cup-shaped casing of magnetic material for said electromagnet provided with a flange adapted to lie flush against and be secured to a panel with said main shaft perpendicular to the panel, and means to manually operate said shaft from the opposite side of the panel.

6. In a rotary electro-magnetic switch, a main shaft, a plurality of rotary contact means constructed and arranged in balanced relation thereon, an electro-magnet for holding said contact means in one position, spring means moving said contact means into another position when said electro-magnet is deenergized, said electro-magnet comprising an armature constructed and arranged on said shaft in balanced relation, toroidal solenoid coils acting on said armature, fixed contacts engageable by one of the rotary contact means and connected to opposite ends of one of said toroidal coils, other fixed contacts engageable by another of said rotary contact means when said one rotary contact means is in open-circuit position, means to energize another of said coils to cause movement of said one rotary contact means from closed to open-circuit condition and to thereupon energize the first-mentioned coil whereby both coils act to hold said switch in energized position.

7. In a rotary electro-magnetic switch, a main shaft, a plurality of rotary contact means constructed and arranged in balanced relation thereon, an electro-magnet for holding said contact means in one position, spring means moving said contact means into another position when said electro-magnet is deenergized, said electro-magnet comprising an armature constructed and arranged on said shaft in balanced relation, toroidal solenoid coils acting on said armature, fixed contacts engageable by one of the rotary contact means and connected to opposite ends of one of said toroidal coils, other fixed contacts engaged by a second and a third of said rotary contact means, certain of said last-mentioned fixed contacts being electrically common and the remainder of said last-mentioned contacts being adapted for connection to different sources of power, means to energize another of said coils to cause movement of said first-mentioned rotary contact means from closed to open-circuit condition and to thereupon energize the first-mentioned coil whereby both coils hold said switch in energized position.

8. In a rotary electro-magnetic switch, a main shaft, a plurality of rotary contact means constructed and arranged in balanced relation thereon, an electro-magnet for holding said contact means in one position, spring means moving said contact means into another position when said electro-magnet is deenergized, said electro-magnet comprising an armature constructed and arranged on said shaft in balanced relation, toroidal solenoid coils acting on said armature, a plurality of identical insulating discs, fixed contacts mounted on one of said discs and engageable by one of the rotary contact means and connected to opposite ends of one of said toroidal coils, other fixed contacts mounted on another of said discs and engageable by another of said rotary contact means when said one rotary contact means is in open-circuit position, means to energize another of said coils to cause movement of said one rotary contact means from closed to open-circuit condition and to thereupon energize the first-mentioned coil whereby both coils act to hold said switch in energized position, said discs being recessed to form enclosed cavities between adjoining discs for said rotary contact means.

9. In a rotary electro-magnetic switch, an electro-magnet comprising a rotary balanced armature, a main shaft rotated by said armature, field coils for energizing said armature, a housing for said electro-magnet and a cover therefor both of magnetically conductive material, a plurality of identical insulating discs centrally recessed to provide a cavity for fixed and moving contact members when two of said discs are nested together, said discs having in one face radial grooves, fixed line and load contact members received in said grooves and having contact portions extending into said cavity, rotary contact members mounted on said main shaft and movable therewith to engage and disengage said fixed contacts, a securing bolt electrically and structurally joining two load contacts of adjacent discs, the opposed contacts in said discs being adapted for connection to normal and emergency power lines respectively, spring means biasing said main shaft to engage one rotary contact into engagement with the emergency and load contacts, energization of said electro-magnet causing said spring means to be overcome and to move said one rotary contact to open-circuit position and simultaneously moving another rotary contact into engagement with the normal and load contacts, and an insulating cover disc nested against the end of said contact supporting discs.

10. In a rotary electro-magnetic switch, a plurality of rotary contact means at least one of which is a bridging contact, an electromagnet for holding said contact means in one position against a normal bias into another position, said electro-magnet comprising a rotary armature, solenoid coils acting on said armature, fixed contacts engageable by said bridging contact means and connected to opposite ends of one of said coils, other fixed contacts engageable by another of said rotary contact means when said bridging contact means is in open-circuit position, means to energize another of said coils to cause movement of said bridging contact means from closed to open-circuit condition and thereupon to energize the first-mentioned coil whereby both coils act to hold said switch in energized position.

HAROLD E. SCHLEICHER.

REFERENCES CITED

The following references are of record in the file of this patent or the original patent:

UNITED STATES PATENTS

| Number | Name | Date |
|---|---|---|
| 539,376 | Bliss | May 14, 1895 |
| 591,491 | Parkin | Oct. 12, 1897 |
| 1,051,542 | Bissell | Jan. 28, 1915 |
| 1,207,016 | Fryer | Dec. 5, 1916 |
| 1,426,993 | Kardaetz | Aug. 22, 1922 |
| 1,438,727 | Schwagermann | Dec. 12, 1922 |
| 1,701,352 | Bailey | Feb. 5, 1929 |
| 1,702,035 | Berthold | Feb. 12, 1929 |
| 1,744,930 | Spencer | Jan. 28, 1930 |
| 1,891,247 | Shapiro | Dec. 20, 1932 |
| 1,913,826 | Blosser | June 13, 1933 |
| 2,012,492 | Arnold et al. | Aug. 27, 1935 |
| 2,254,509 | Bassett, Jr. | Sept. 2, 1941 |
| 2,267,116 | Mageoch et al. | Dec. 23, 1941 |
| 2,314,291 | Taylor | Mar. 16, 1943 |
| 2,339,675 | Bucklen et al. | Jan. 18, 1944 |
| 2,393,535 | Horman | Jan. 22, 1946 |